No. 807,961. PATENTED DEC. 19, 1905.
W. J. PATON.
METALLIC TIRE.
APPLICATION FILED JUNE 14, 1905.
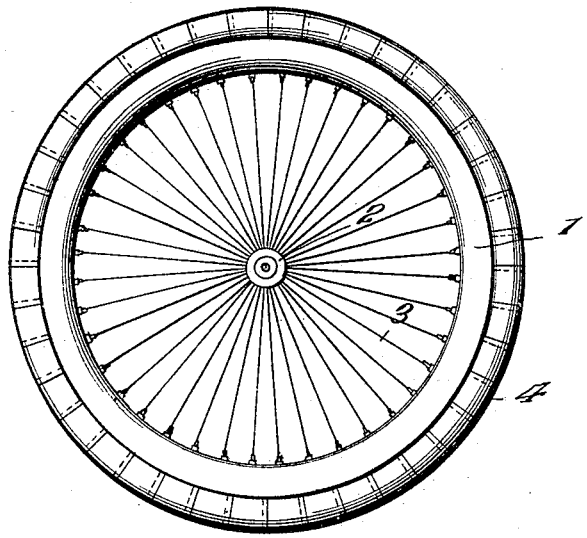
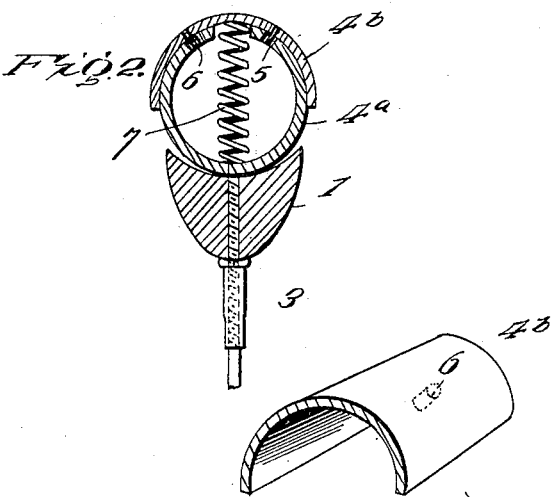
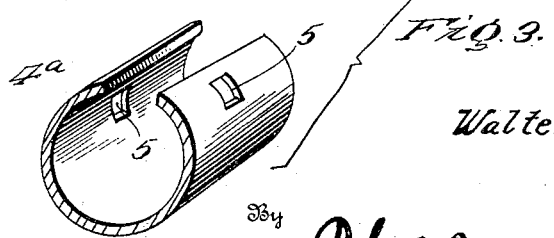
Inventor
Walter J. Paton.
Witnesses
By
Attorneys

UNITED STATES PATENT OFFICE.

WALTER J. PATON, OF GALVA, KANSAS.

METALLIC TIRE.

No. 807,961.  Specification of Letters Patent.  Patented Dec. 19, 1905.

Application filed June 14, 1905. Serial No. 265,251.

*To all whom it may concern:*

Be it known that I, WALTER J. PATON, a citizen of the United States, residing at Galva, in the county of McPherson and State of Kansas, have invented certain new and useful Improvements in Metallic Tires, of which the following is a specification.

This invention aims to provide an effective substitute for the ordinary cushion and pneumatic tires at present commonly employed on wheels of automobiles, bicycles, and vehicles of various types.

The invention consists of a tire for wheels which does away with the use of rubber, which is more serviceable and has as much if not more elastic or cushion qualities than rubber, and which is cheaper, so far as cost of production is concerned.

For a full description of the invention and the merits thereof and also to acquire a knowledge of the details of construction of the means for effecting the result reference is to be had to the following description and accompanying drawings, in which—

Figure 1 is a side elevation of a wheel having a tire embodying the invention applied thereto. Fig. 2 is a transverse sectional view through the rim portion of the wheel, bringing out more clearly the form of the parts of the tire. Fig. 3 is a detail perspective view of the members composing each of the tubular sections of the tire.

Corresponding and like parts are referred to in the following description and indicated in all the views of the drawings by the same reference characters.

In carrying out the invention it is designed to secure a simple construction, as well as one having the advantages which have been before set forth, and, specifically describing the same, the numeral 1 indicates the rim of a wheel, which may be of any common type, having the hub 2 and suitable spokes 3. The outermost portion of the rim is formed with a concave seat or channel receiving the base of the tire, a construction ordinarily used.

A tire comprising this invention is preferably made of metal and is composed of a plurality of tubular sections 4, connected at opposite ends, and each of the tubular sections 4 is composed of complemental members, which will be described as relatively stationary, and movable members $4^a$ and $4^b$, respectively. The members $4^a$ and $4^b$ of the sections of the tire are formed of curved or concave plates, and the member $4^a$ is of nearly circular form, the member $4^b$ receiving in its concave side the outermost portions of the member $4^a$, as shown most clearly in Fig. 2 of the drawings. The members $4^a$ and $4^b$ are connected together by a pin-and-slot connection which admits of movement of these members, so as to give rise to the necessary elasticity or resiliency of the tire as a whole under conditions of actual service. The sides of the section $4^a$ are adapted to have a certain amount of movement toward and from each other and are provided with slots 5 therein, into which pins 6, projected from the concave side of the member $4^b$, are adapted to operate, said pins 6 affording virtually a sliding connection between the members $4^a$ and $4^b$, in a manner which will be obvious. Interposed between the members $4^a$ and $4^b$ and normally holding said members separated substantially as shown in Fig. 2, are springs 7, at least one spring being disposed between the members of each of the sections 4. The springs 7 are preferably of the coil type and may be attached at their outer ends to the inner sides of the members $4^b$ and at their inner ends are preferably held in place by means of the spokes 3, which pass through the rim 1, and the members $4^a$ to afford a securing means for the parts $4^a$, as well as the springs 7. Each of the tubular sections 4 tapers slightly toward one end thereof, and the larger end of one tubular section is held in connection with the smaller end of the other tubular section by a friction-joint, each of the sections 4 having a telescopic connection with its adjacent sections, which permits the members of each section to move freely and increase the resiliency and elasticity of the parts of the tire in a manner which will be manifest.

It is of course clear that the springs 7 receive the shock caused in the actual use of the tire, and these springs relieve the shock to such an extent as to secure a tire of practical advantage over the various rubber tires, which are expensive and which are easily worn out.

Having thus described the invention, what is claimed as new is—

1. A tire composed of a plurality of tubular sections, each section consisting of relatively movable members, means connecting said members, and a spring interposed between said members.

2. A tire composed of a plurality of tubular sections, each section composed of relatively movable members having a pin-and-slot connection, and a spring interposed between said members.

3. In combination, a wheel embodying a hub, a rim, a tire fitted about the rim and composed of a plurality of connected tubular sections, each section consisting of complemental relatively movable members of concave form, a spring between the members of each section, and spokes connecting the hub with the rim aforesaid and connected with the springs in the tubular sections.

In testimony whereof I affix my signature in presence of two witnesses.

WALTER J. PATON. [L. S.]

Witnesses:
 DAVID J. SMITH,
 U. Z. WRIGHT.